Figure 1:
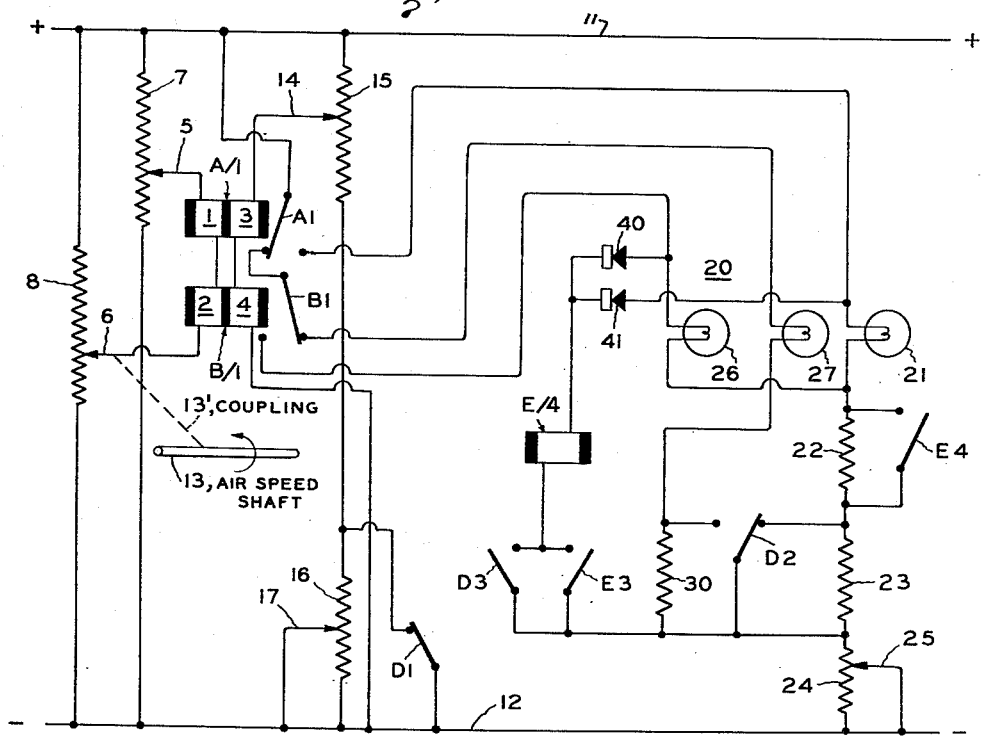

Dec. 17, 1957    W. H. ALEXANDER ET AL    2,817,077
ELECTRICAL INDICATING APPARATUS
Filed Oct. 28, 1955

INVENTORS
William Hector Alexander
Herbert John Arrott
Donald Murdo McCallum
BY
Cameron, Kerkam & Sutton
ATTORNEYS

United States Patent Office 2,817,077
Patented Dec. 17, 1957

2,817,077

ELECTRICAL INDICATING APPARATUS

William Hector Alexander, Edgware, England, and Herbert J. Arnott and Donald M. McCallum, Edinburgh, Scotland, assignors to Ferranti, Limited, Lancashire, England, a company of Great Britain and Northern Ireland Application October 28, 1955, Serial No. 543,424

Claims priority, application Great Britain October 28, 1954

7 Claims. (Cl. 340—282)

This invention relates to electrical apparatus for indicating any departure of a quantity from a given range of values and the sense of such departure.

The invention may be applied to aircraft navigation—for example, to indicate to the pilot of an aircraft about to land whether or not his airspeed (the quantity above mentioned) is within a given range of values; and, if the speed is outside the range, to show on which side of the range the error lies, that is to say, to show whether the speed is too high or too low. In such application it is usually additionally desirable to give some indication of the extent of the departure from the given range—for example, to show whether the speed is much too high or only somewhat too high. Because of the pilot's occupation with other matters it is desirable that all such indication should be simple, clear, and unambiguous.

The invention is not confined to such uses but has wide application wherever indications of the kind referred to are needed.

An object of the present invention is to provide electrical indicating apparatus for the purpose stated which is simple and inexpensive and in which the indications given are clear and unambiguous.

A further object is to provide such apparatus wherein some indication is also given of the extent of departure of the quantity from the given range.

According to the present invention, electrical apparatus for indicating any departure of a quantity from a given range of values containing a datum value, and the sense of such departure, comprises means for representing said datum value by a datum voltage, means for representing said quantity by a quantity voltage, control apparatus for maintaining the difference between said voltages in sense dependence and quantitative dependence on the difference between said quantity and said datum value as said quantity varies, first and second biased polarized relays the operating windings of which are connected for energization by the said difference between said voltages in such manner that any such difference sets up fluxes which respectively assists the bias flux of one of said relays (as determined by the sense of the difference) and oppose the bias flux of the other relay, the values of said bias fluxes of the relays being in such dependence on said given range of values of said quantity as to allow the operation of said other relay when said quantity departs from said range, and circuits for energizing a first or a second indicating device on the operation of said first or said second relay as the case may be.

Oscillatory apparatus may be provided for causing said bias fluxes to alternate repetitively between said values thereof and increased values, whereby an indication is afforded of the extent of any departure of said quantity from said given range.

Figure 2:
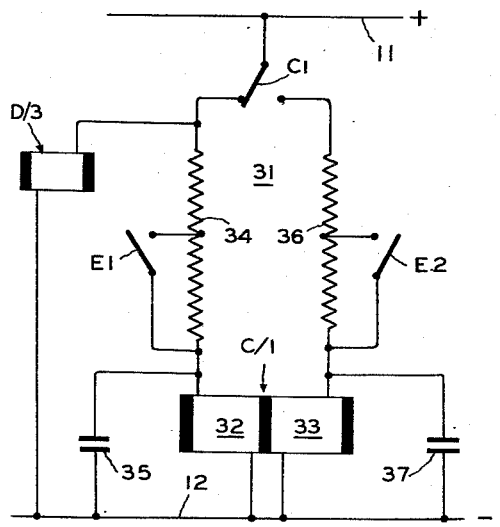
Figure 3:
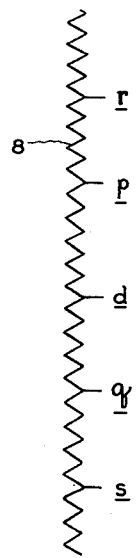

In the accompanying drawings,

Figures 1 and 2 are schematic diagrams of two parts of one embodiment of the invention, and Figure 3 shows to an enlarged scale a part of one of the components shown in Figure 1.

The invention will now be described by way of example as used for indicating to the pilot of an aircraft any departure of the airspeed from a given range of values containing a datum value, and the sense and something of the extent of such a departure. It is assumed that an airspeed indication is available as a shaft rotation.

The apparatus of the invention is a relay system. In accordance with the usual practice the various contacts are depicted in Fig. 1 in the condition appropriate to the unoperated condition of the relays; where a relay is a biased polarized relay, and hence is sensitive to the direction of the flux set up by the windings, the term "unoperated condition" means that condition due to the bias flux. Contacts that are closed, and contacts that are opened, when a relay is operated are referred to as the make contacts and the break contacts respectively. These are therefore depicted as open and closed, respectively.

In detail, the apparatus comprises first and second biased polarized relays A/1 and B/1 (see Fig. 1) having operating windings 1 and 2, and bias windings 3 and 4, respectively. Operating windings 1 and 2 are connected in series between a slider 5 on a potentiometer 7, constituting means for representing the datum value of the airspeed by a datum voltage, and a slider 6 on a potentiometer 8, constituting means for representing the actual value of the airspeed by a quantity voltage, these potentiometers being connected in parallel between positive and negative power supply leads 11 and 12. Slider 5 is for preset use. Slider 6 is controlled by control apparatus in the form of a shaft 13 and some kind of coupling 13¹, shaft 13 being rotated in dependence on the airspeed. To simplify the explanation it will be assumed that the coupling 13¹ between shaft and slider is such that increase in airspeed moves the slider upwards, thereby increasing its voltage with respect to the negative supply lead 12.

Bias windings 3 and 4 are connected in series between lead 12 and a preset slider 14 in a bias potentiometer 15, which potentiometer is connected in series with a rheostat 16 across the supply leads. Rheostat 16 is provided with a preset slider 17 connected to lead 12 to vary the effective resistance of this rheostat by short-circuiting a part of it.

The directions of windings 1 to 4 are such that whenever a voltage difference exists between sliders 5 and 6—and in consequence a current flows through the operating windings 1 and 2 of both relays—the fluxes set up by that current assist the bias flux in one of the relays and oppose it in the other. The factor which decides in which relay the bias flux is opposed and in which it is assisted is the direction of the actuating current and hence the sense of the voltage difference between sliders 5 and 6. It will be assumed that when the voltage of slider 6 is the greater, the relay in which the bias flux is opposed is relay A, the bias flux of relay B being assisted. Naturally the reverse conditions obtain when the voltage of slider 6 is the lower.

The circuits for energizing the associated indicating devices, which in this example are lamps, are contained in a display unit 20. Across the supply leads 11 and 12 are connected in series make contacts A1 of relay A, a first indicating lamp 21 of, say, amber colour, and dimming resistors 22, 23, and 24, in that order. Resistor 24 is provided with a slider 25 connected to lead 12.

Also in series across the supply leads are connected break contacts A1, make contacts B1 of relay B, a second indicating lamp 26 of red colour, and resistors 22 to 24. And a further series path across the supply comprises break contacts A1, break contacts B1, a third indicating lamp 27 of green colour, a dimming resistor 30, and resistor 24.

To actuate the indicating devices intermittently—that is, by causing the lamps to flash bright and dim—thereby rendering the indications more noticeable, and to cause the bias fluxes to alternate repetitively, thereby giving some indication of the extent of any departure of the airspeed from the given range, there is provided a relay oscillator 31, see Fig. 2. This consists of a biased polarized relay C/1 having operating and bias windings 32 and 33 respectively. Winding 32 is connected in series with a resistor 34 and break contacts C1 of the relay across the supply leads 11 and 12; a capacitor 35 is connected across this winding. Winding 33 is connected in series with a resistor 36 and make contacts C1 across the supply; a capacitor 37 is connected across this winding. Components 32, 34 and 35 have similar characteristics to components 33, 36 and 37 respectively. In series with break contacts C1 across the supply leads is connected a relay D/3.

Break contacts D1 of relay D are connected across rheostat 16. Break and make contacts D2 are connected across resistors 23 and 30 respectively. Make contacts D3 are connected between one end of the winding of a further relay E/4 and, by way of resistor 24, supply lead 12. The other end of this winding is connected to supply lead 11 by two paths in parallel: (*a*) a rectifier 40, make contacts B1, and break contacts A1 in series; and (*b*) another rectifier 41 and make contacts A1 in series. The rectifiers are inserted in such sense as to prevent these parallel paths from acting as a short circuit between the connections to lamps 21 and 26.

The energizing circuit of relay E thus includes contacts D3, controlled by oscillator 31 by way of relay D, and contacts A1 and B1, controlled by the first and second relays respectively.

Make contacts E1 and E2 of relay E are connected across equal portions of resistors 34 and 36 respectively. Make contacts E3 are connected in parallel with make contacts D3. And make contacts E4 are connected across resistor 22.

To simplify the description of the operation of the apparatus the effect of relays C, D, and E will at first be ignored, it being assumed to begin with that the respective contacts of relays D and E are permanently in the closed or open conditions depicted in Fig. 1.

In operation, slider 5 is preset so that its voltage with respect to the negative supply lead 12 represents the datum value of the airspeed within the given range, this voltage being equal to that of slider 6 when shaft 13 is in the rotational position appropriate to that speed; the position of slider 6 on potentiometer 8 at this datum speed is indicated at *d* in Fig. 3. Slider 14 is preset (as is described in more detail later) to the given range of airspeeds. The corresponding positions of slider 6 at the higher and lower ends of this range are indicated in Fig. 3 at *p* and *q*, respectively, one on each side of point *d*. The distance *pq* thus represents the given range of speeds, the point *d* being midway between points *p* and *q* where, as is usually the case, relays A and B have like characteristics. It will be appreciated that these three points are not fixed with respect to potentiometer 8 but vary in position on it according to the settings of sliders 5 and 14.

So long as slider 6 is at *d*, its voltage equals that of slider 5 and no current flows in the operating windings 1 and 2 of relays A and B. Both these relays are therefore in their unoperated condition; consequently both break contacts A1 and B1 are closed and green lamp 27 is illuminated by way of these contacts.

Suppose now that the airspeed increases above the datum value. The resulting rotation of shaft 13 moves slider 6 upwards towards point *p*. This increases the voltage of slider 6 above that of slider 5. There is now a voltage difference in sense and quantitative dependence on the difference between the actual and the datum airspeeds. A current therefore flows in the actuating windings of both relays; as stated above, the effect of a current due to a voltage difference of this sense is to set up in relay A a flux which opposes the bias flux but in relay B a flux which assists the bias flux. The value of the bias flux, as preset by the adjustment of slider 14, is such that not until slider 6 reaches the point *p* does the flux set up by winding 1 of relay A sufficiently overcome the bias flux as to cause the relay to operate.

When relay A operates, contacts A1 change over and amber lamp 21 becomes illuminated instead of green lamp 27, thereby indicating that the airspeed is above the given range, i. e. is too high. This indication lasts until the speed is lowered sufficiently for slider 6 to fall below point *p*. As the bias flux in relay B is assisted by that due to the actuating winding, this relay remains unoperated.

Similarly if the speed falls below the datum value. As soon as slider 6 falls below the point *q* relay B is operated and contacts B1 change over to illuminate red lamp 26 (indicating that the speed is too low) instead of green lamp 27.

So long as slider 6 remains within the range *pq* the green lamp 27 remains illuminated to show that the speed is within the given range.

The operation of oscillator 31 and the associated relays D and E and their effect on the signal indication so far described will now be briefly shown.

Oscillator 31 is of the RC kind and operates as follows, starting at the moment when the contacts C1 are in the condition depicted, i. e. with the energizing circuit of operating winding 32 just completed. Relay C accordingly operates and the make contacts C1 close to complete the energizing circuit of winding 33. Capacitor 37 begins to charge up through resistor 36 and continues charging until the voltage across it energizes winding 33 sufficiently to cause the relay to restore. As the relay restores, contacts C1 change back (to the condition illustrated) to complete the energizing circuit of winding 32. Capacitor 35 therefore charges up whilst capacitor 37 discharges through winding 33. Eventually the voltage across capacitor 35 is sufficient to operate the relay again and the whole cycle is repeated. Contacts C1 accordingly oscillate from one to the other of their two conditions at the frequency of the oscillator, remaining for an equal time in each condition.

Each time the break contacts C1 are closed, relay D/3 is operated from the supply. The resulting opening of contacts D1 inserts in series with potentiometer 15 the portion of rheostat 16 not short-circuited by slider 17, thereby increasing the voltage of slider 14 with respect to lead 12 and so increasing together the values of the bias fluxes of relays A and B. The effect of this is to expand the range symmetrically from the given range *pq* to the expanded range *rs* (Fig. 3), the extent of the expansion being determined by the setting of slider 17.

As soon as break contacts C1 open, relay D restores, contacts D1 close, and the range is contracted to the given range *pq*. Oscillator 31 thus causes the bias fluxes to alternate repetitively, both increasing and both decreasing together in each relay, between the values in dependence on the given range and increased values, as determined by the settings of sliders 14 and 17, thereby causing the range to be alternately expanded from and contracted to the given range between limits set by these sliders.

Whenever slider 6 is in an intermediate zone between the expanded and the given ranges—between points *p* and *r*, say—relay A is operated each time the contacts D1 are closed and the effective range is *pq*, since slider 6 is then outside the range, but becomes restored each time contacts D1 open to extend the range to *rs*. Contacts A1 thus change over periodically at the frequency of oscillator 31. Lamp 21 is therefore illuminated alternately with lamp 27 at that frequency, this signal being interpreted as meaning that the airspeed is above the given range but within the expanded range. Contacts D2 change over at the same frequency, short-circuiting resistors 23 and 30 alternately; the phasing of these contacts with respect to those of A1 is such that each of these resistors is short-circuited when the lamp in series with it is energized, so that both lamps give a bright rather than a dim display.

Similarly when slider 6 is between points $q$ and $r$: lamp 26 is now illuminated alternately with lamp 27.

Whenever slider 6 is outside the expanded range $rs$ in either direction, only lamp 21 or only lamp 26, as the case may be, is illuminated. Such illumination is however rendered intermittently bright and dim by the intermittent opening and closing of break contacts D2 and the consequent intermittent connection in the circuit of resistor 23. The make contacts D2 cause the green lamp 27 to flash bright and dim whenever the slider is within the given range $pq$. There is however a difference in these flashing rates; this is due to the operation of relay E4.

The function of this relay is to modify the indication—that is, provide a more noticeable lamp signal—whenever the airspeed passes outside the expanded range $rs$. The relay is energized in dependence on the fact that when this occurs the relay D is operated, and therefore contacts D3 are closed, at a time when the make contacts A1 or B1 are closed; relay E is then operated by way of these contacts, rectifier 40 and 41, as the case may be, and contacts D3. Relay E thereupon locks itself on by way of its make contacts E3 and remains operated so long as the A1 or B1 make contacts remain closed—that is, so long as the airspeed is outside the expanded range $rs$.

The effect of the operation of relay E is twofold. In the first place, by causing parts of resistors 34 and 36 to be short-circuited by contacts E1 and E2 the frequency of oscillator 31 is increased, thereby increasing the flashing rate of the lamp 21 or 26 illuminated. In the second place, by the closing of contacts E4 resistor 22 is short-circuited and the brightness of the lamp is increased. The fact that the airspeed is outside even the expanded range is thus indicated more emphatically by a brighter lamp flashing bright and dim more rapidly.

The indications given by the apparatus may be summarized as follows:

(1) Airspeed far too high (above the expanded range): amber lamp flashes very bright and dim at rapid rate
(2) Airspeed rather too high (in intermediate zone): amber and green lamps alternate brightly at moderate rate
(3) Airspeed approximately correct (in the given range): green lamp flashes bright and dim at moderate rate
(4) Airspeed rather too low (in intermediate zone): red and green lamps alternate brightly at moderate rate
(5) Airspeed far too low (below the expanded range): red lamp flashes very bright and dim at rapid rate The basic brightness of the lamps may be controlled by adjusting slider 25.

It will readily be appreciated that the apparatus of the invention, though built up from a few inexpensive components, gives to the pilot very clear and unambiguous indications, five quite clearly distinguishable signals being given by only three lamps. Moreover by a few simple adjustments of sliders 5, 14 and 16, as already explained, the value of the datum airspeed and the extents of the two ranges may be set as desired.

The lamps may conveniently be located in the cockpit so as to be reflected in the windscreen when illuminated; the pilot can then observe their indications whilst continuing to look at the landing stage as well.

Various details of the above-described embodiment may be modified within the scope of the invention. The ranges need not be symmetrical with respect to the datum value; in some applications it may be desirable to compress the ranges on one side of datum—say the too-low side, in the above example—where the warnings are more urgently required than on the other side. This may be readily effected by making the bias flux in one relay greater than that in the other relay.

The bias fluxes need not necessarily be set up entirely by means of energized windings but may be set up to some extent by permanent magnets.

Instead of being fixed (preset) the datum value may be continuously variable—for example, to indicate to a pilot following a glide path the condition of his altitude with respect to a range of altitudes on each side of a "datum" altitude that continuously decreases as the aircraft approaches the ground. In this case the slider 5 is made to traverse potentiometer 7 so that its voltage at any given moment represents the datum altitude at that moment, slider 6 being controlled in dependence on the actual altitude.

The datum and quantity voltages, the difference between which actuates relays A and B, may be derived in other ways than by means of potentiometers 7 and 8.

The oscillatory apparatus may be of a different type from the relay oscillator described.

The indicating devices need not be lamps and need not be such as to give a visual indication; devices that give an aural indication—e. g. notes of various tone—may in some cases be preferred.

Many details of the circuits may be varied. Rectifiers 40 and 41 may for example be replaced by resistors of value higher than the resistances of the lamps but not high enough to prevent the operation of relay E.

It is again emphasized that the invention is not confined to aircraft uses of the kind described above but has application wherever clear indications of departures of a quantity from a given range of values are required.

What we claim is:

1. Electrical apparatus for indicating any departure of a quantity from a given range of values containing a datum value, and the sense of such departure, comprising means for representing said datum value by a datum voltage, means for representing said quantity by a quantity voltage, control apparatus for maintaining the difference between said voltages in sense dependence and quantitative dependence on the difference between said quantity and said datum value as said quantity varies, first and second biased polarized relays each having a bias winding and an operating winding, the values of the bias fluxes produced by said bias windings being representative of the given range of values of said quantity and adjustable to vary the extent of said range, the operating windings of said relays being connected for energization by the said difference between said voltages in such manner that any such difference sets up fluxes which respectively assist the bias flux of one of said relays (as determined by the sense of the difference) and oppose the biax flux of the other relay, the values of said bias fluxes of the relays being in such dependence on said given range of values of said quantity as to allow the operation of said other relay when said quantity departs from said range, and circuits for energizing a first or a second indicating device on the operation of said first or said second relay as the case may be.

2. Apparatus as claimed in claim 1 wherein oscillatory apparatus is provided for causing said bias fluxes to alternate repetitively between said values thereof and increased values, whereby an indication is afforded of the extent of any departure of said quantity from said given range.

3. Apparatus as claimed in claim 2 wherein there is provided a further relay the energizing circuit of which includes contacts so controlled by the oscillatory apparatus and the first and second relays that this further relay is operated when either of the first or second relays is operated during a period when said bias fluxes have the increased values, there being further provided means for modifying the indication given by the first or second indicating device, as the case may be, on the operation of this further relay.

4. Apparatus as claimed in claim 3 wherein said oscillatory apparatus is arranged to cause the intermittent actuation of at least one of the first and second indicating devices and wherein the operation of said further relay is arranged to alter the frequency of operation of the oscillatory apparatus.

5. Apparatus as claimed in claim 1 wherein a circuit is provided for energizing a third indicating device when neither said first nor said second relay is operated.

6. Apparatus as claimed in claim 1 including means for adjusting the values of said bias fluxes to vary the extent of said given range without varying said datum voltage.

7. Apparatus as claimed in claim 2 including means for adjusting the increased values of said bias fluxes without varying the values of said fluxes corresponding to said given range.

References Cited in the file of this patent
UNITED STATES PATENTS

| | | |
|---|---|---|
| 2,663,008 | McEwan | Dec. 15, 1953 |
| 2,709,797 | McEwan | May 31, 1955 |